(12) United States Patent
McCaffrey et al.

(10) Patent No.: US 8,562,285 B2
(45) Date of Patent: Oct. 22, 2013

(54) ANGLED ON-BOARD INJECTOR

(75) Inventors: Michael G. McCaffrey, Windsor, CT (US); Joseph T. Caprario, Cromwell, CT (US); George E. Allen, Manchester, CT (US); Christopher Moore, Newington, CT (US); Ronald R. Gagnon, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1452 days.

(21) Appl. No.: 11/772,335

(22) Filed: Jul. 2, 2007

(65) Prior Publication Data

US 2009/0010751 A1   Jan. 8, 2009

(51) Int. Cl.
*F01D 25/12* (2006.01)
*F01D 9/06* (2006.01)

(52) U.S. Cl.
USPC .......................................... 415/115; 415/176

(58) Field of Classification Search
USPC ........................... 415/115, 144, 176; 239/600
See application file for complete search history.

(56) References Cited

U.S. PATENT DOCUMENTS

| | | |
|---|---|---|
| 4,526,511 A | 7/1985 | Levine |
| 4,709,545 A | 12/1987 | Stevens et al. |
| 4,822,244 A | 4/1989 | Maier et al. |
| 4,825,643 A * | 5/1989 | Hennecke et al. ............. 60/806 |
| 4,872,810 A | 10/1989 | Brown et al. |
| 5,310,319 A | 5/1994 | Grant et al. |
| 5,358,374 A * | 10/1994 | Correia et al. ................ 415/47 |
| 5,484,258 A | 1/1996 | Isburgh et al. |
| 5,522,698 A | 6/1996 | Butler et al. |
| 5,597,167 A | 1/1997 | Snyder et al. |
| 5,645,397 A | 7/1997 | Soechting et al. |
| 5,996,331 A * | 12/1999 | Palmer ........................... 60/782 |
| 6,183,193 B1 | 2/2001 | Glasspoole et al. |
| 6,227,801 B1 | 5/2001 | Liu |
| 6,267,553 B1 | 7/2001 | Burge |
| 6,398,488 B1 * | 6/2002 | Solda et al. .................... 415/115 |
| 6,468,032 B2 | 10/2002 | Patel |
| 6,540,477 B2 * | 4/2003 | Glynn et al. ................... 415/115 |
| 6,647,730 B2 | 11/2003 | Liu |
| 6,655,906 B1 | 12/2003 | Yuri et al. |
| 6,722,138 B2 | 4/2004 | Soechting et al. |
| 6,773,225 B2 | 8/2004 | Yuri et al. |
| 6,837,676 B2 | 1/2005 | Yuri et al. |
| 6,857,626 B2 | 2/2005 | Burlage et al. |
| 6,916,151 B2 * | 7/2005 | Judet et al. .................... 415/115 |
| 6,969,237 B2 | 11/2005 | Hudson |
| 6,974,306 B2 | 12/2005 | Djeridane et al. |
| 7,017,349 B2 | 3/2006 | Laurello et al. |
| 7,090,461 B2 | 8/2006 | Liang |
| 7,118,326 B2 | 10/2006 | Liang |

* cited by examiner

*Primary Examiner* — Nathaniel Wiehe
*Assistant Examiner* — Sean J Younger
(74) *Attorney, Agent, or Firm* — Carlson, Gaskey & Olds P.C.

(57) ABSTRACT

A secondary flow system provides a compact injector cooling structure for turbine blades which includes an Angled On-board Injector (AOBI) that locates a metering throat at an inward angle relative to an engine centerline. The AOBI positions the metering throat at the inward angle relative to an engine centerline to communicate cooling airflow to an angled annular section of a turbine rotor disk coverplate.

17 Claims, 2 Drawing Sheets

ANGLED ON-BOARD INJECTOR

BACKGROUND OF THE INVENTION

The present invention relates to a gas turbine engine cooling structure that provides a cooling air flow to turbine blades, and more particularly to an Angled On-Board Injector (AOBI) that locates a metering throat at an inward angle relative to an engine centerline.

In gas turbine engines, fuel is burned within a combustion chamber to produce hot gases of combustion. The hot gases are expanded within a turbine section to produce a gas stream across alternating rows of stationary turbine stator vanes and rotating turbine rotor blades to produce power. Turbine blades and vanes are cooled by air compressed upstream within the engine and flowed to the turbine section through a secondary flow system.

Secondary flow systems transfer cooling air which bypasses the combustor from stationary cavities within the engine stator to a turbine rotor assembly for subsequent distribution to the interior of the rotor blades. For this purpose, the tangential on-board injector (TOBI) is a conventional and effective device. In particular, an inlet of the TOBI nozzle receives compressed air from the compressor to pass the cooling air through annually spaced passages that impart a swirling motion to direct the stream of cooling air tangentially to the rotating turbine assembly.

The volume and direction of the cooling air are features of the secondary flow system effectiveness and overall engine performance. The secondary flow system should provide a desired metered amount of cooling air as additional cooling air may penalize efficiency of combustion while too little cooling air may result in overheating of the turbine blades and seals.

Engine performance for a relatively small gas turbine engine may often be interrelated to secondary flow system effectiveness. Packaging of a secondary flow system may be particularly complicated, as conventional Tangential On-Board Injectors (TOBI) or Radial On-Board Injectors (ROBI) require a radial height and seal structure that may be incompatible with such relatively small packaging requirements.

Accordingly, it is desirable to provide a compact injector cooling structure for a relatively small gas turbine engine which transfers cooling air from stationary cavities within a turbine stator assembly to a turbine rotor assembly thereof, yet minimizes the required radial height and lowers losses therefrom.

SUMMARY OF THE INVENTION

The secondary flow system according to the present invention provides a compact injector cooling structure for a gas turbine engine that includes an Angled On-board Injector (AOBI) to locate a metering throat at an inward angle relative to an engine centerline.

The AOBI includes a generally annular upstream wall, an annular downstream wall and an annular body which interconnects the upstream and downstream walls. The upstream wall and the downstream wall interface with an annular inner flow path wall such that cooling air from a turbine vane is directed into the AOBI and toward an angled annular section of a turbine rotor coverplate.

The angled annular section is located at a corresponding angle relative the engine centerline such that the angled annular section is generally transverse to the AOBI nozzle. The AOBI allows for a flexible design which can be optimized such that the axial and radial packaging is minimized. The angled annular section may thereby be located at a smaller radius verses a TOBI to conserve radial height. Because the AOBI is angled inward, the intersection of the flow with the turbine rotor coverplate inlet feature also requires less radial spacing than a traditional TOBI. The AOBI creates additional design flexibility when aligning the nozzle discharge to the holes in the coverplate. Furthermore, the AOBI is located at a relatively small radius with the resulting benefit of lower cavity pressure.

In operation, cooling air from a source such as an engine compressor flows through the annular outer flow path wall, the stator vane and through an annular inner flow path wall. From the annular inner flow path wall, the cooling air is directed radially inward toward the engine centerline between an upstream wall and a downstream wall. The cooling air flows toward the annular body and into the AOBI. The cooling air is injected from the AOBI into the annular AOBI cavity. The cooling air enters apertures in the turbine rotor disk coverplate, flows through the disk radial passage and inlets, then cools the turbine blades.

The present invention therefore provides a compact injector cooling structure for a relatively small gas turbine engine which transfers cooling air from stationary cavities within a turbine stator assembly to a turbine rotor assembly thereof, yet minimizes the required radial height and axial spacing and lowers losses therefrom.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
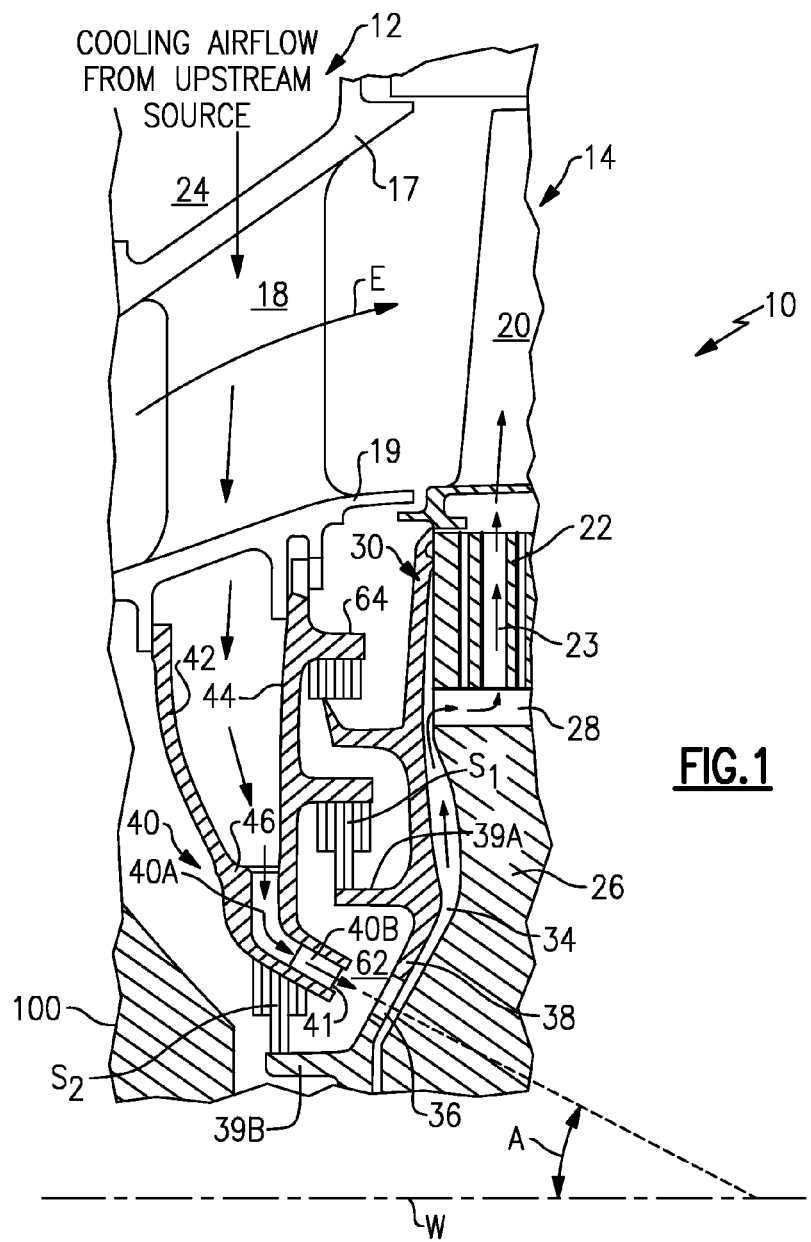
FIG. 1 is a fragmentary axial cross section of a portion of the turbine section of a gas turbine engine showing a AOBI nozzle for the distribution of cooling air to turbine blades.

FIG. 1 schematically illustrates a simplified portion 10 of the turbine section of a gas turbine engine. Included within the portion shown is a turbine stator assembly 12 and a turbine rotor assembly 14. A flow path E for combustion gases is provided downstream of a combustion chamber (not shown) and defined in part by the stator assembly 12 including an annular outer flow path wall 17 and an annular inner flow path wall 19. The flow path E extends generally axially between alternating rows of stator vanes which form a stator vane section as represented by the single vane 18, and rows of rotor blades which form a rotor blade section as represented by the single blade 20. An annular cavity 24 is formed within the stator assembly 12 and it functions in part as a reservoir for turbine cooling air.

Downstream of the row of stator vanes 18 is disposed the row of rotor blades 20. The rotor blades 20 extend radially outwardly from a supporting rotor disk 26 via respective rotor blade roots 22 which are mounted in the supporting rotor disk 26. The supporting rotor disk 26 includes a plurality of axial inlets 28, each communicating with internal radial passages 23 of the root 22 and the blade 20. Only part of the passages 23 and their surface apertures within the blade 20 being shown, through which cooling air is flowable to the blade 20. After circulating through the passages 23, the cooling air discharges into the flow path E through a plurality of small apertures, forming a protective film over the blade's external surface.

A rotor coverplate 30 is mounted upstream of the rotor disk 26 to rotate therewith. The rotor assembly 14 forms an annular and radial passage 34 between the rotor disk 26 and the rotor cover 30.

Figure 2:
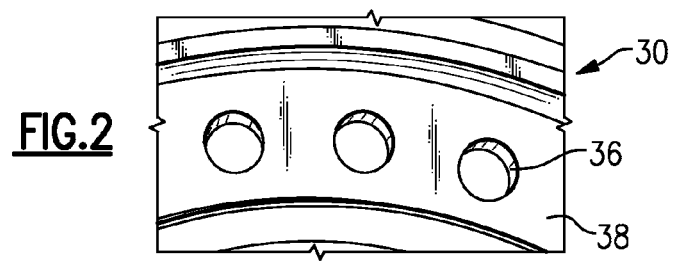
FIG. 2 is a frontal plan view of a turbine rotor disk coverplate.

A multitude of apertures 36 (also illustrated in FIG. 2) are located through the rotor coverplate 30. The apertures 36 communicate with the passage 34 for the intake of cooling air to the axial inlets 28. The multitude of coverplate apertures 36 are located through an angled annular section 38 defined between an upper flange 39A and a lower flange 39B of the rotor coverplate 30. The upper flange 39A and the lower flange 39B extend generally parallel to the engine centerline W and are respectively engaged by an upper seal S1 and a lower seal S2.

A cooling air delivery structure in the form of an Angled On-Board Injection (AOBI) 40 includes a generally annular upstream wall 42, an annular downstream wall 44 and an annular body 46 which interconnects the upstream and downstream walls 42, 44. The upstream wall 42 and the downstream wall 44 interface with the inner flow path wall 19 such that cooling air discharged radially inward from the vane 18 is directed into the AOBI 40. The AOBI 40 may generally include a number of discrete nozzles, with each nozzle containing a radial nozzle section 40A and an angled nozzle section 40B. The angled nozzle section 40B defines a metering throat 41 angled radially inward and aftward. It should be understood that various flow shaping structures in addition or alternatively to the discrete nozzles may also be utilized with the present invention. While the exemplary AOBI is shown facing aft, it is contemplated that the AOBI could also be mirrored about an axial plane such that the AOBI discharges forward.

The AOBI 40 places the metering throat 41 at the inward angle A relative to an engine centerline W. The angled nozzle section 40B is located at a corresponding angle relative to the engine centerline W such that the nozzle discharge is aligned with the coverplate aperture 36. The AOBI allows for a flexible design which can be optimized such that the axial and radial packaging is minimized. That is, the AOBI 40 decouples the placement of the throat 41 from the placement of the coverplate apertures 36 which allows more flexibility in their placement and a more capable coverplate design. The angled annular section 38 may thereby be located at a smaller radius verses a TOBI to conserve radial height. Because the AOBI is angled inward, the intersection of the flow exiting the nozzle 41, point a (FIGS. 3A, 3B), with the rotor coverplate aperture 36, point b, (FIGS. 3A, 3B) can be designed to require less radial spacing than a traditional TOBI. Furthermore, the AOBI 40 is located at a relatively small radius with the resulting benefit of lower cavity pressure requirements typical of a Radial On-Board Injector (ROBI). Lower loss coverplate apertures 36 may also be utilized because the coverplate apertures 36 are at a relatively larger radius about engine axis W than that required by a ROBI.

The AOBI cavity 62 is defined in part by the angled annular section 38, the upper flange 39A and the lower flange 39B into which the angled nozzle section 40B at least partial extends. It should be understood that various seal arrangements may be readily integrated with the AOBI within a tightly packaged space.

Based on the cooling system and engine design constraints there is an optimum, cooling air system configuration. The optimum geometry is found when the constraints of the physical geometry are balanced with the need for an efficient cooling air system. Within the tight confines of certain small engines, the desire to have low cavity pressures and low-pressure losses dictates that the cooling air transfer has to occur at the smallest possible radius. Additionally, the cross sectional area of the cooling holes, required to provide low pressure losses, combined with the need for acceptable structural margins in the rotating seal coverplate, dictate a minimum radius for the pattern of cooling holes. The shape of the cooling holes, quantity and pattern shape is optimized for structural and airflow needs.

The physical dimensions of the two rotating turbine rotors 14 and 100 are determined by structural integrity requirements and the constraints of engine flowpath and overall engine length. They define the primary axial and radial zone for the cooling air system. The physical dimensions of typical high-speed seals, and the desire for redundancy establish additional axial and radial boundaries for where an AOBI can fit. Machining and casting tolerances combined with the required cooling airflow set the physical design constraints for the geometry of the AOBI.

Figure 3A:
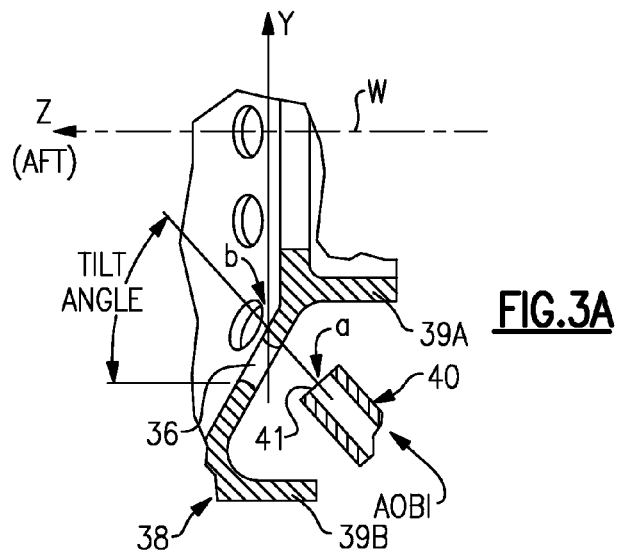
FIG. 3A is schematic longitudinal sectional view of a turbine rotor disk coverplate relative to a position of the AOBI nozzle.
Figure 3B:
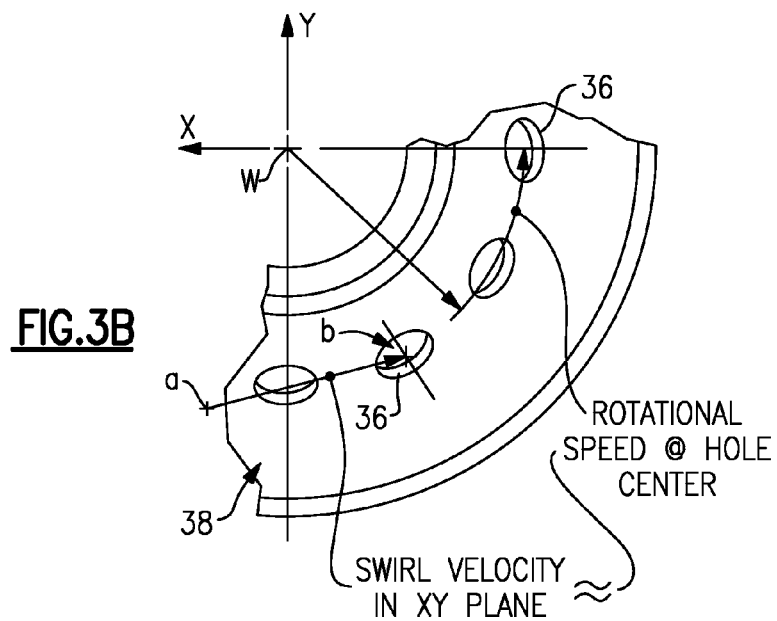
FIG. 3B is an expanded plan view of the rotor coverplate illustrated in FIG. 3A.
Figure 3C:
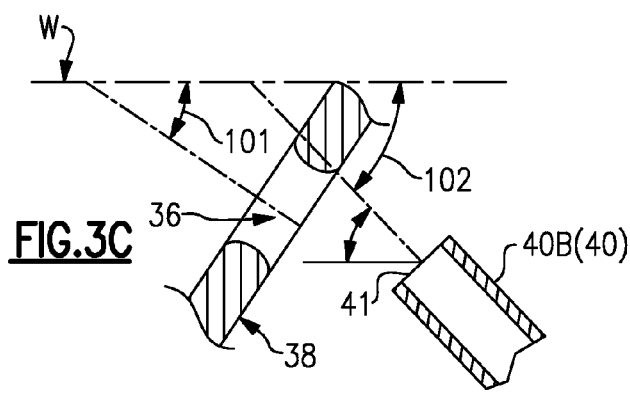
FIG. 3C is an expanded view of the AOBI nozzle illustrated in FIG. 3A.

The optimum compound angle for the AOBI is a balance between targeting the cooling hole location, as it rotates away from the AOBI exhaust ports, and the axial and radial location of the AOBI nozzle. At some combination of swirl velocity and axial tilt, the air exiting the AOBI nozzle will intersect the rotating cooling hole at the design conditions where point a is the exit of a particular nozzle 41 and point b is the intersection point of cooling air exiting a particular nozzle element 41, point a, and the center of the coverplate aperture 36 such that the swirl velocity measured in the XY plane equals the rotational speed of apertures 36 and the cooling flow from point a to point b occurs with the least pressure loss (FIGS. 3A and 3B). In the AOBI design, there is an increase in available design space, because the tilt angle and swirl velocity can be varied independently, to optimize the axial and radial geometry of the AOBI exhaust port. In the disclosed embodiment, an efficient cooling air system is readily designed to fit the available space and satisfy the structural and cooling system design constraints. It should be understood that angle 102 need not be equal to 101 (FIG. 3C).

Generally, the cooling system design provides: low cavity pressure gradients to the surrounding flowpath; minimal pressure losses; redundant seal configurations to avoid loss of cooling supply air; cooling air transfer between stationary hardware and the rotating hardware occur with the least losses; cooling air in the direction of the rotation, such that the cooling air velocity matches the rotational speed of the cooling hole; cooling air exiting from the AOBI to intersect the path of the rotating cooling holes, such that, at the design point, the cooling air vector is targeted at the center of the rotating cooling hole; and cooling air transport within the turbine rotor to occur with the least losses. Generally, the engine design disclosed herein provides: the shortest axial length possible within the confines of the optimal flowpath geometry; secondary structures, like the AOBI and stationary seals, to fit within the confines set by the primary structures such as the turbine rotors and vanes; and rotating seal coverplates to transport cooling air from the AOBI, to the turbine blade.

In operation, cooling air from an upstream source such as an engine compressor flows through the annular outer flow path wall 17, the stator vane 18 and through the annular inner flow path wall 19. From the annular inner flow path wall 19, the cooling air is directed radially downward toward the engine centerline W between the upstream wall 42 and the downstream wall 44. The cooling air moves therebetween as the air flows toward the annular body 46. The cooling air enters a number of discrete nozzles by first entering into radial nozzle section 40A and then angled nozzle section 40B. The cooling air is injected from the AOBI 40 into the annular AOBI cavity 62 and enters apertures 36. The cooling air then flows radially outwardly through the passage 34, the axial inlets 28 through the radial passages 23, then cools the blade 20 as indicated by the arrows. After cooling the blade 20, the cooling air is discharged into the flow path E through a plurality of small apertures (not shown).

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cooling structure for a gas turbine engine comprising:
an upstream wall defined transverse to an engine axis;
a downstream wall transverse to said engine axis;
an annular body which interconnects said upstream wall and said downstream wall; and
an angled on-board injector extending from said body, said injector including a radial nozzle section and an angled nozzle section angled relative said engine axis, said angled nozzle section extends at least partially into an angled on-board injector cavity defined in part by an angled annular section of a rotor coverplate having a multiple of apertures located therethrough such that an airflow from said angled on-board injector is directed toward said multiple of apertures.

2. The cooling structure as recited in claim 1, wherein said angled nozzle section is angled between approximately 0 degrees and 90 degrees relative said engine axis.

3. The cooling structure as recited in claim 1, wherein said angled nozzle section defines a metering throat.

4. The cooling structure as recited in claim 1, wherein said angled annular section is transverse to said angled nozzle section.

5. A cooling structure for a gas turbine engine comprising:
a turbine stator assembly defined about an engine axis;
an angled on-board injector in fluid communication with said turbine stator assembly, said angled on-board injector including an angled nozzle section angled relative said engine axis; and
a turbine blade assembly adjacent said turbine stator assembly, said turbine blade assembly having a rotor coverplate mounted upstream of a rotor disk to rotate therewith, said rotor coverplate having a multiple of apertures through an angled annular section said rotor coverplate, said angled nozzle section extends at least partially into an angled on-board injector cavity defined in part by said angled annular section such that an airflow from said angled on-board injector is directed toward said multiple of apertures.

6. The cooling structure as recited in claim 5, wherein said angled on-board injector is radially inboard of said stator assembly.

7. The cooling structure as recited in claim 5 wherein said angled nozzle section is transverse to said angled on-board injector.

8. The cooling structure as recited in claim 5, wherein said angled nozzle section is angled toward said turbine blade assembly.

9. The cooling structure as recited in claim 5, wherein said angled nozzle section is angled radially inboard and toward said turbine blade assembly.

10. The cooling structure as recited in claim 5, wherein said angled nozzle section is angled between approximately 0 degrees and 90 degrees.

11. A cooling structure for a gas turbine engine comprising:
a turbine stator assembly defined about an engine axis;
an angled on-board injector in fluid communication with said turbine stator assembly, said angled on-board injector including an angled nozzle section angled relative said engine axis; and
a turbine blade assembly adjacent said turbine stator assembly, said turbine blade assembly having a rotor coverplate mounted upstream of a rotor disk to rotate therewith, said rotor coverplate having a multiple of apertures through an angled annular section of said rotor coverplate, said angled nozzle section extends at least partially into an angled on-board injector cavity defined in part by said angled annular section of said rotor coverplate such that said angled nozzle section is generally transverse to said angled annular section and an airflow from said angled on-board injector is directed toward said multiple of apertures.

12. The cooling structure as recited in claim 11, wherein said angled annular section is generally perpendicular to said angled nozzle section.

13. The cooling structure as recited in claim 1, wherein said angled annular section of said rotor coverplate is defined between an upper flange and a lower flange which extend generally parallel to said engine centerline.

14. The cooling structure as recited in claim 13, further comprising an upper seal and a lower seal which respectively engage said upper flange and said lower flange to define said angled on-board injector cavity.

15. The cooling structure as recited in claim 13, wherein said angled on-board injector cavity is annular.

16. The cooling structure as recited in claim 1, wherein said angled nozzle section is transverse to said angled annular section.

17. The cooling structure as recited in claim 16, wherein said radial nozzle section is generally perpendicular to said engine axis.

* * * * *